(12) United States Patent
Muir et al.

(10) Patent No.: US 10,407,841 B2
(45) Date of Patent: Sep. 10, 2019

(54) ROTARY MIXING SYSTEM

(71) Applicant: Caterpillar Paving Products Inc., Brooklyn Park, MN (US)

(72) Inventors: Jason William Muir, Andover, MN (US); Valerio E. D'Ascanio, Bologna (IT); Dario Sansone, Castello d'Argile (IT); Brian Joe Schlenker, Shoreview, MN (US); Mark Leslie Eiden, Rogers, MN (US)

(73) Assignee: Caterpillar Paving Products Inc., Brooklyn Park, MN (US)

( * ) Notice: Subject to any disclaimer, the term of this patent is extended or adjusted under 35 U.S.C. 154(b) by 0 days.

(21) Appl. No.: 15/792,814

(22) Filed: Oct. 25, 2017

(65) Prior Publication Data

US 2019/0119867 A1 Apr. 25, 2019

(51) Int. Cl.
*E01C 19/10* (2006.01)
*E01C 19/08* (2006.01)
*E01C 21/00* (2006.01)
*B60P 1/38* (2006.01)
*B60Q 1/50* (2006.01)
*E01C 19/02* (2006.01)
*E01C 23/06* (2006.01)
*E01C 23/088* (2006.01)

(52) U.S. Cl.
CPC ............ *E01C 19/1054* (2013.01); *B60P 1/38* (2013.01); *B60Q 1/50* (2013.01); *E01C 19/02* (2013.01); *E01C 19/08* (2013.01); *E01C 19/10* (2013.01); *E01C 19/105* (2013.01); *E01C 19/1036* (2013.01); *E01C 21/00* (2013.01); *E01C 23/065* (2013.01); *E01C 23/088* (2013.01)

(58) Field of Classification Search
CPC .......... E01C 19/02; E01C 19/08; E01C 19/10; E01C 19/1036; E01C 19/105
See application file for complete search history.

(56) References Cited

U.S. PATENT DOCUMENTS 3,662,953 A * 5/1972 Wiens .................. E01C 19/174
239/112
3,990,684 A * 11/1976 Seskin .................. E01C 19/45
366/10

(Continued)

FOREIGN PATENT DOCUMENTS

EP 0149848 7/1990
JP 4881281 2/2012

*Primary Examiner* — Abigail A Risic
(74) *Attorney, Agent, or Firm* — Jeff A. Greene (57) ABSTRACT

A rotary mixing system for a construction machine includes a frame, and a power source mounted on the frame. The machine also includes a milling tool rotatably mounted on the frame and configured to be selectively coupled to the power source. The machine further includes a foaming bar mounted on the frame in association with the milling tool. The system also includes an auxiliary vehicle configured to be coupled to the machine. The auxiliary vehicle includes a chassis and a plurality of wheels movably mounted to the chassis. The auxiliary vehicle includes a bitumen tank mounted on the chassis. The auxiliary vehicle also includes a heating element and a bitumen pump coupled to the bitumen tank. The auxiliary vehicle further includes a bitumen hose fluidly coupled to the bitumen pump and the foaming bar.

16 Claims, 7 Drawing Sheets

(56) References Cited

U.S. PATENT DOCUMENTS

| | | |
|---|---|---|
| 5,015,120 A | 5/1991 | Brock et al. |
| 5,035,534 A | 7/1991 | Brock et al. |
| 5,642,961 A | 7/1997 | Campbell |
| 5,957,621 A * | 9/1999 | Clark, Jr. ............... E01C 19/176 239/159 |
| 6,887,013 B2 * | 5/2005 | Ley ....................... B05B 1/3046 404/90 |
| 7,160,056 B1 | 1/2007 | Hoffmann et al. |
| 7,641,418 B2 * | 1/2010 | Hall .................... E01C 23/0885 404/72 |
| 8,077,023 B2 | 12/2011 | King et al. |
| 8,956,076 B2 | 2/2015 | Menzenbach et al. |
| 9,068,296 B1 | 6/2015 | Hulicsko et al. |
| 2008/0193214 A1 * | 8/2008 | Hall ...................... E01C 23/065 404/75 |
| 2013/0087172 A1 * | 4/2013 | Roetsch .................. E01C 21/00 134/8 |
| 2016/0222603 A1 * | 8/2016 | Cervelli ................ E01C 19/176 |
| 2018/0142431 A1 * | 5/2018 | Bullivant ............ E01C 19/1027 |

\* cited by examiner

FIG. 7

ROTARY MIXING SYSTEM

TECHNICAL FIELD

The present disclosure relates to a rotary mixing system. More particularly, the present disclosure relates to the rotary mixing system for forming formed asphalt.

BACKGROUND

A machine such as a rotary mixer is employed for reclamation and stabilization process of a ground surface. In some situations, an additive such as formed asphalt tray be added to the ground surface in order to improve the reclamation and stabilization process. Typically, foamed asphalt is formed by mixing heated bitumen with water using a foaming bar. In order to form foamed asphalt as per required specifications, it is required for the bitumen to be heated and maintained within a required temperature range prior to mixing with water.

The bitumen may be heated in a bitumen plant and brought to a worksite in a bitumen tanker. In such a situation, it may be difficult to maintain a temperature of the bitumen within the required temperature range in the bitumen tanker for an extended period of time, such as during travel of the bitumen tanker from the bitumen plant to the worksite, during the reclamation and stabilization process, during process downtime due to unfavorable weather conditions, other delays, and so on.

In some situations, a foamed asphalt system may be provided on the rotary mixer in order to limit cooling of the heated bitumen and maintain the temperature of the bitumen within the required temperature range for the extended period of time. However, such a system may include a number of components that may have to be added onto the rotary mixer, such as a water tank, a water pump, a bitumen tank, a bitumen pump, a heating system, a foaming bar, an electric power pack, and so on.

However, installing the foamed asphalt system may limit a flexibility of the rotary mixer to be employed for other reclamation and stabilization process when an additive other than foamed asphalt may be required. Also, due to a bulk and complexity of the foamed asphalt system it may be laborious and time consuming for a user to assemble and/or disassembly the formed asphalt system with respect to the rotary mixer as may be required. Also, having the foamed asphalt system installed on the rotary mixer may increase machine cost and complexity. Hence, there is a need to an improved rotary mixing system.

U.S. Pat. No. 8,956,076 describes a construction machine having at least one metering device configured to meter at least one binder into a mixing chamber. The machine further includes a control unit operably connected to the at least one metering device and configured to control a quantity of the at least one binder metered into the mixing chamber per unit of time automatically in relation to a quantity of milled material milled up per unit of time. The control unit is also configured to control a quantity of the at least one binder currently metered into the mixing chamber prior to a rotor reaching a specified milling depth as a function of a milled-off quantity of milled material currently present in the mixing chamber.

SUMMARY OF THE DISCLOSURE

In an aspect of the present disclosure, a rotary mixing system is provided. The rotary mixing system includes a construction machine. The construction machine includes a frame and a power source mounted on the frame. The construction machine also includes a milling tool rotatably mounted on the frame and configured to be selectively coupled to the power source. The construction machine further includes a foaming bar mounted on the frame in association with the milling tool. The rotary mixing system also includes an auxiliary vehicle configured to be coupled to the construction machine. The auxiliary vehicle includes a chassis and a plurality of wheels movably mounted to the chassis. The auxiliary vehicle also includes a bitumen tank mounted on the chassis and a heating element coupled to the bitumen tank. The auxiliary vehicle further includes a bitumen pump fluidly coupled to the bitumen tank and a bitumen hose fluidly coupled to the bitumen pump and the foaming bar.

In another aspect of the present disclosure, an auxiliary vehicle is provided. The auxiliary vehicle is configured to be selectively coupled to a construction machine. The auxiliary vehicle includes a chassis and a plurality of wheels movably mounted to the chassis. The auxiliary vehicle includes a bitumen tank mounted on the chassis. The auxiliary vehicle also includes a heating element and a bitumen pump coupled to the bitumen tank. The auxiliary vehicle further includes a bitumen hose fluidly coupled to the bitumen pump and configured to be selectively coupled to a foaming bar associated with the construction machine to provide foamed asphalt from the foaming bar for introduction into a milling enclosure.

In yet another aspect of the present disclosure, a method of forming timed asphalt is provided. The method includes providing a construction machine having a foaming bar mounted thereon. The method includes providing an auxiliary vehicle in association with the construction machine. The method includes providing a flow of bitumen from a bitumen tank provided on the auxiliary vehicle to the foaming bar. The method also includes providing a flow of water from a water tank provided on at least one of the construction machine and the auxiliary vehicle to the foaming bar. The method further includes forming foamed asphalt by mixing of the flow of bitumen and the flow of water at the foaming bar.

Other features and aspects of this disclosure will be apparent from the following description and the accompanying drawings.

DETAILED DESCRIPTION

Wherever possible, the same reference numbers will be used throughout the drawing to refer to the same or the like parts. Retorting to FIGS. 1 to 5, an exemplary rotary mixing system 100 is illustrated. The rotary mixing system 100 will be hereinafter interchangeably referred to as "the system 100". The system 100 includes a construction machine 102. The construction machine 102 will be hereinafter interchangeably referred to as "the machine 102". More specifically, the machine 102 is a rotary mixer. The machine 102 may be employed for reclaiming and stabilizing a ground surface. The machine 102 may also be employed for preparing the ground surface for various purposes, such as construction of roads and buildings, for agricultural applications, and so on.

The machine 102 includes a frame 104. The frame 104 is configured to support one or more components of the machine 102. The machine 102 includes an enclosure 106 mounted on the frame 104. The enclosure 106 configured to house a power source (not shown) therein mounted on the frame 104. The power source is configured to provide power to the machine 102 for mobility and operational requirements. In the illustrated embodiment, the power source is an internal combustion engine powered by any fuel known in the art, such as diesel, gasoline, natural gas, and so on. Accordingly, the machine 102 includes a fuel tank 108 mounted on the frame 104. The fuel tank 108 is configured to store fuel therein required by the power source. In other embodiments, the power source may be any other power source known in the art, such as a motor, batteries, and so on.

The machine 102 includes a set of ground enraging members 110 mounted to the frame 104. In the illustrated embodiment, the ground engaging members 110 include wheels. In other embodiments, the ground engaging members 110 may include tracks, a compaction drum, and so on, based on application requirements. The ground engaging members 110 are configured to support and provide mobility to the machine 102 on the ground surface. The machine 102 includes an operator cabin 112 mounted on the frame 104. The operator cabin 112 may include one or more operator consoles, control levers, switches, audio visual devices, steering wheel, and so on for an operator to operate and control the machine 102.

The machine 102 further includes a milling enclosure 114 mounted on the frame 104. The milling enclosure 114 is configured to reclaim and pulverize the ground surface. The milling enclosure 114 includes a milling tool (not shown) rotatably mounted therein. The milling tool may be selectively coupled to the power source using a transmission system (not shown), such as a belt drive, a gear train, a clutch system, a hydraulic system, and so on. The milling tool may include a plurality of cutting elements provided thereon, such as cutting teeth. The milling tool is configured to remove and pulverize material from the ground surface by cutting, scraping, milling, and so on. A depth of a cut or penetration of the cutting teeth of the milling tool may be controlled by adjusting a height of the milling enclosure 114 and the milling tool with respect to the ground surface by appropriate extension or retraction of each of hydraulic struts 116.

Additionally, the machine 102 includes a foaming bar 117 mounted on the frame 104. The foaming bar 117 may be a set of valve controlled spray nozzles configured to mix heated bitumen, air and water to form foamed asphalt. The foaming bar 117 is provided in association with the milling enclosure 114 and the milling tool. Accordingly, the foaming bar 117 is configured to provide selective quantities of the foamed asphalt as an additive into the milling enclosure 114 adjacent to the milling tool. As such, due to a rotation of the milling tool, the foamed asphalt may mix with the pulverized material within the milling enclosure 114. A mixture of the pulverized material and the foamed asphalt may be then deposited on a milled portion of the ground surface as the machine 102 may move forward along the ground surface.

The system 100 also includes an auxiliary vehicle 118. The auxiliary vehicle 118 will be hereinafter interchangeably referred to as "the vehicle 118", The vehicle 118 is configured to be selectively coupled to the machine 102 via a connector link 120. The vehicle 118 includes a chassis 122. The chassis 122 is configured to support one or more components of the vehicle 118. The vehicle 118 includes a plurality of wheel 124 movably mounted to the chassis 122. The plurality of wheels 124 is configured to support and provide mobility to the vehicle 118 on the ground surface. In some embodiments, the plurality of wheels 124 may be configured to steer the auxiliary vehicle 118 on the around surface.

The vehicle 118 includes a bitumen tank 126 mounted on the chassis 122. The bitumen tank 126 is configured to receive, store, and deliver bitumen therefrom. The bitumen tank 126 includes a bitumen port 128 fluidly coupled thereto. The bitumen port 128 is configured to receive bitumen from an external source, such as a bitumen tanker, a bitumen plant, and so on. The vehicle 118 includes a bitumen supply system 130 mounted on the chassis 122 in association with the bitumen tank 126. The bitumen supply system 130 includes a bitumen filter 132 fluidly coupled to the bitumen tank 126. The bitumen filter 132 is configured to filter one or more contaminants from the bitumen.

The bitumen supply system 130 also includes a bitumen pump 134 fluidly coupled to the bitumen tank 126. The bitumen pump 134 is configured to provide a flow of bitumen therethrough, and the bitumen filter 132 may be positioned between the bitumen pump 134 and the bitumen tank 126 so as to filter the bitumen before it enters the bitumen pump 134. The bitumen supply system 130 further includes a bitumen motor 136 operably coupled to the bitumen pump 134. The bitumen motor 136 is configured to provide mechanical power and drive the bitumen pump 134. The bitumen motor 136 may be any motor known in the art, such as an electric motor, a hydraulic motor, and so on. Additionally, the bitumen supply system 130 may include one or more valves 138 configured to control the flow of bitumen from the bitumen tank 126.

The bitumen supply system 130 may include a bitumen hose 140 extending between and fluidly coupled to the bitumen pump 134 and the foaming bar 117 on the machine 102. The bitumen hose 140 is configured to provide the flow of bitumen from the bitumen pump 134 to the foaming bar 117. The bitumen hose 140 may be any hose known in the art, such as a rubber hose, a polymer hose, a steel braided hose, and so on. Additionally, or optionally, the system 100 may include a harness 142 coupled between the machine 102 and the vehicle 118. The harness 142 may be configured to provide electrical/electronic connection between the machine 102 and the vehicle 118. Additionally, or optionally, the system 100 may include one or more hydraulic hoses 144 coupled between the machine 102 and the vehicle 118. The hydraulic hoses 144 may be configured to provide hydraulic connection between the machine 102 and the vehicle 118, such as from a hydraulic system (not shown) associated with the machine 102 to the plurality of wheels 124 of the vehicle 118 for steering thereof.

The vehicle 118 includes a heating element 146 provided in association with the bitumen tank 126. The heating element 146 configured to provide heat to the bitumen present in the bitumen tank 126 and maintain the bitumen within a predefined temperature range. In the illustrated embodiments, the heating element 146 is a fuel powered burner, such as a diesel powered burner, a gasoline powered burner, a gas powered burner, and so on.

Accordingly, the vehicle 118 includes an auxiliary fuel tank 148 provided thereon. The auxiliary fuel tank 148 is configured to store and deliver the fuel to the heating element 146 via a first fuel line 150. In some embodiments, the heating element 146 may be powered by the fuel present in the fuel tank 108 provided on the machine 102. In some embodiments, the heating element 146 may be an electric heater. In such situations, the auxiliary fuel tank 148 may be omitted. The heating element 146 also includes a thermostat 152 coupled to the bitumen tank 126. The thermostat 152 is configured to activate or deactivate the heating element 146 based on the temperature of the bitumen dropping or exceeding the predefined temperature range respectively.

Figure 1:
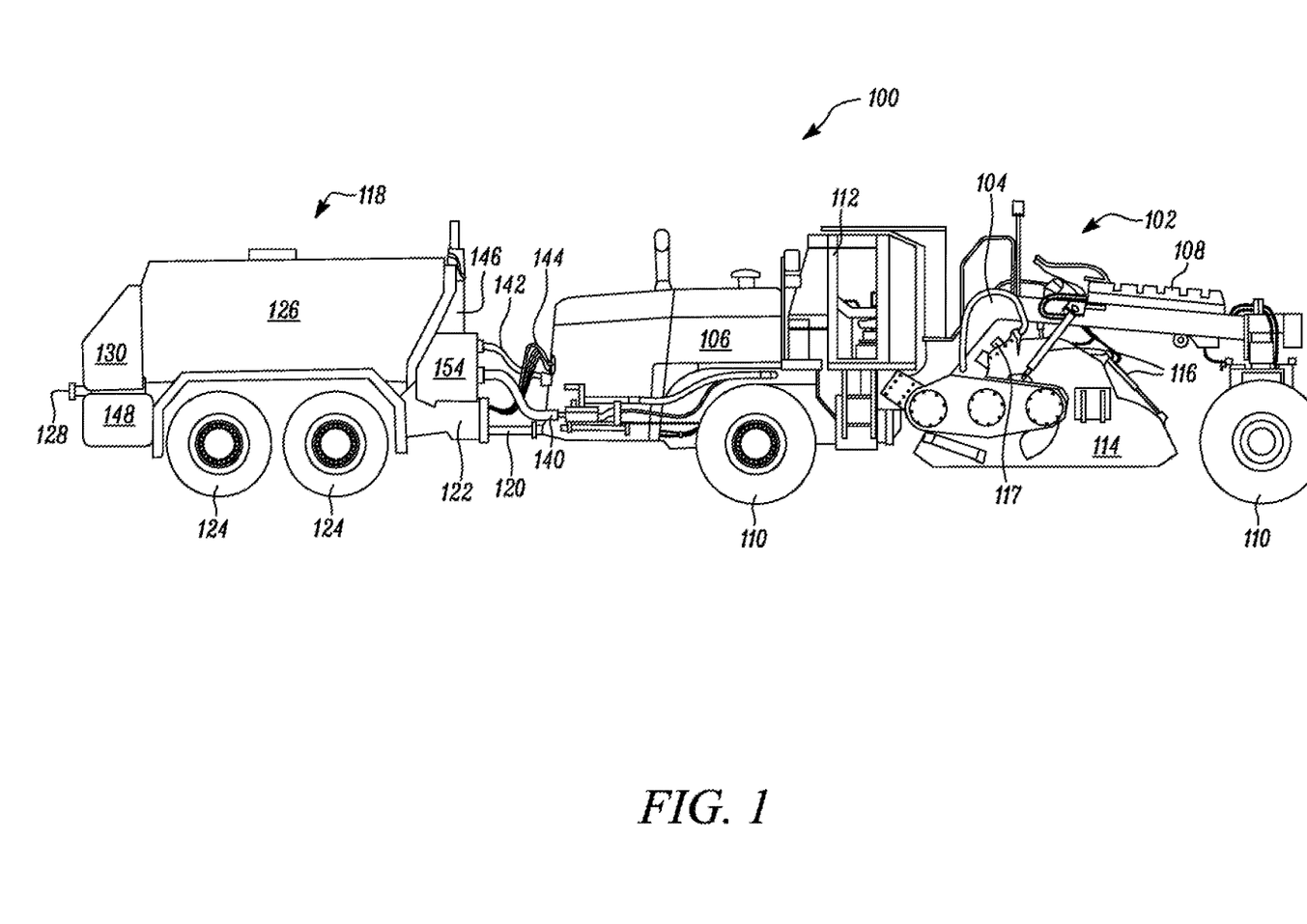
FIG. 1 is a side view of an exemplary rotary mixing system, according to one embodiment of the present disclosure.
Figure 2:
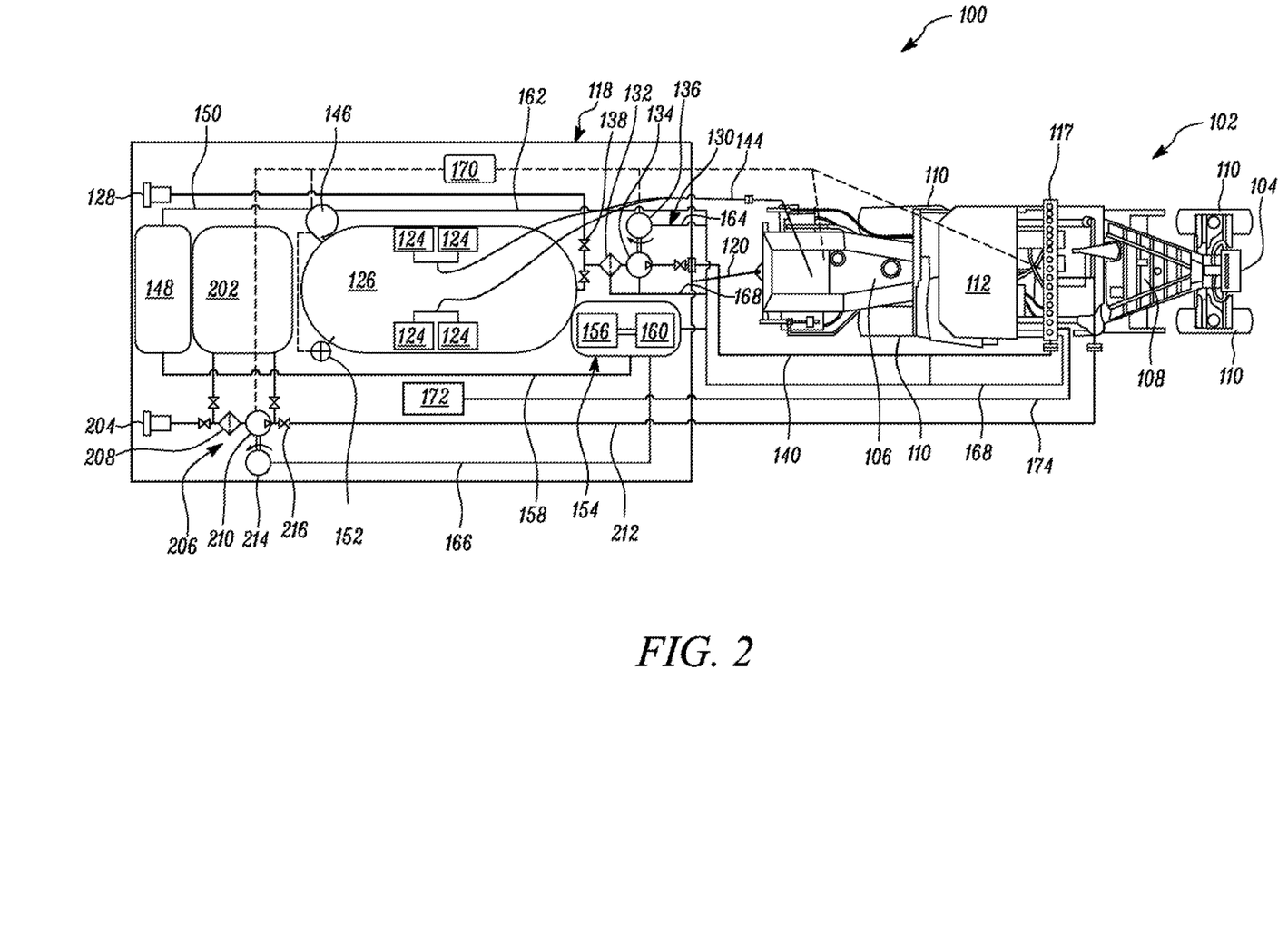
FIG. 2 is a schematic representation of the rotary mixing system of FIG. 1, according to one embodiment of the present disclosure.
Figure 5:
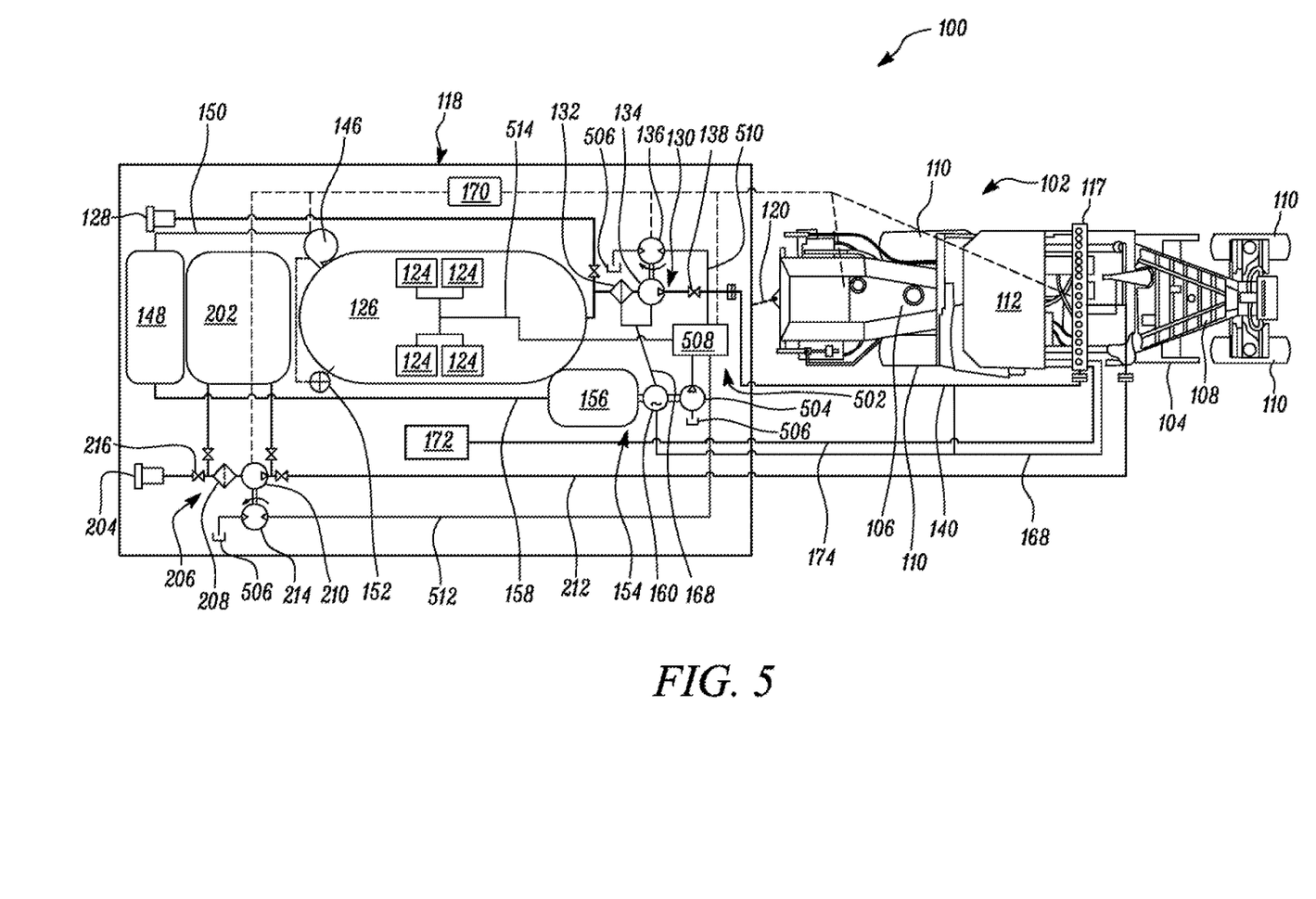
FIG. 5 is another schematic representation of the rotary mixing system of FIG. 1, according to another embodiment of the present disclosure.

Referring to FIGS. 2 and 5, the vehicle 118 includes a water tank 202 mounted on the chassis 122. The water tank 202 is configured to receive, store, and deliver water therefrom. The water tank 202 includes a water port 204 fluidly coupled thereto. The water port 204 is configured to receive water from an external source, such as a water tanker. The vehicle 118 includes a water supply system 206 mounted on the chassis 122 in association with the water tank 202. The water supply stem 206 includes a water filter 208 fluidly coupled to the water tank 202. The water filter 208 is configured to filter one or more contaminants from the water.

The water supply system 206 includes a water pump 210 fluidly coupled to the water tank 202 via the water filter 208, and further to the foaming bar 117 via a water line 212. The water pump 210 is configured to provide a flow of water from the water tank 202 to the foaming bar 117. The water supply system 206 further includes a water motor 214 operably coupled to the water pump 210. The water motor 214 is configured to provide mechanical power and drive the water pump 210. The water motor 214 may be any motor known in the art, such as an electric motor, a hydraulic motor, and so on. Additionally, the water supply system 206 may include one or more valves 216 configured to control the flow of water from the water tank 202.

Figure 3:
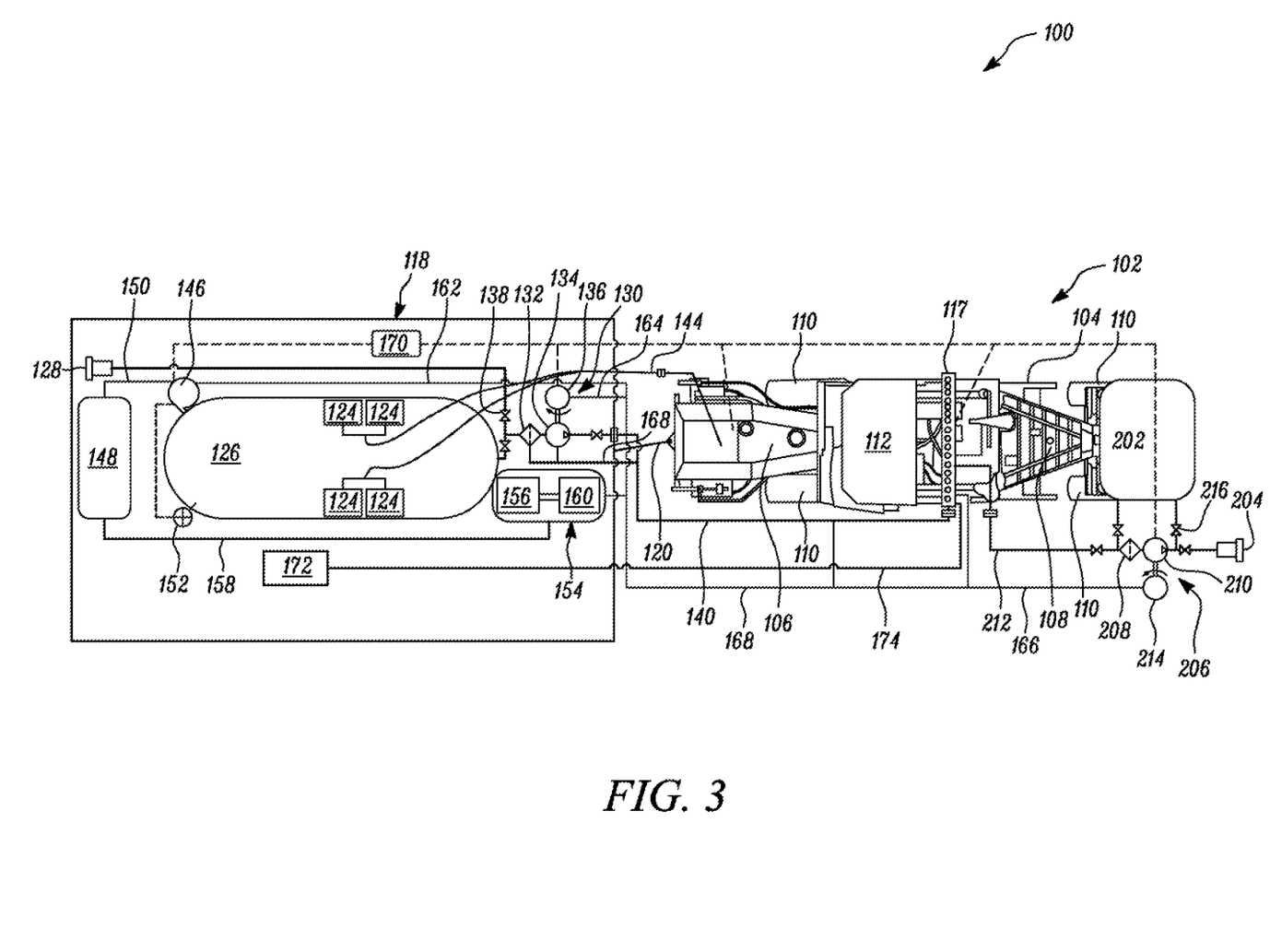
FIG. 3 is another schematic representation of the rotary mixing system of FIG. 1, according to another embodiment of the present disclosure.
Figure 4:
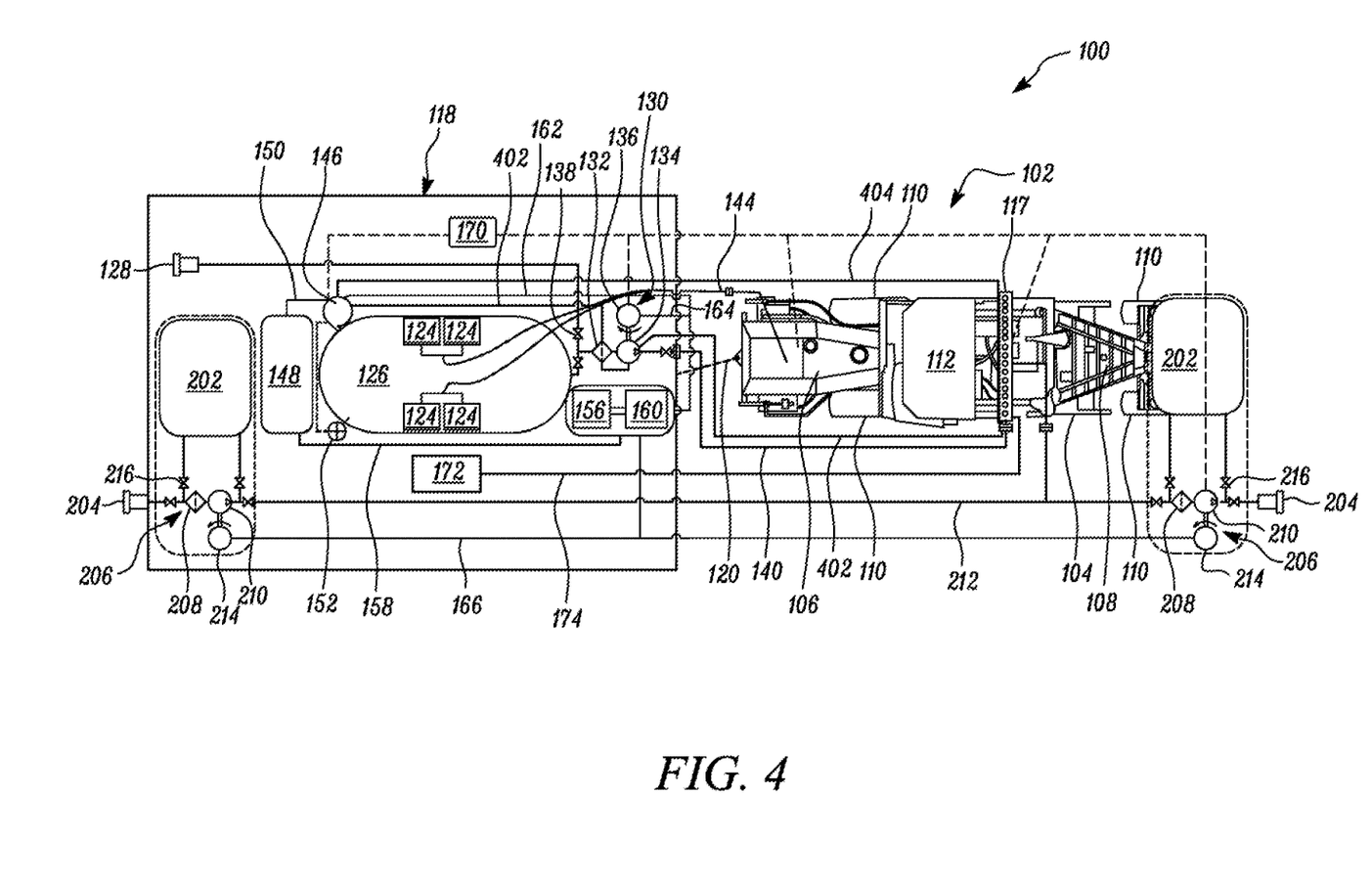
FIG. 4 is another schematic representation of the rotary mixing system of FIG. 1, according to another embodiment of the present disclosure.

In some embodiments, as shown in FIG. 3, the water supply system 206 may be alternatively provided on the machine 102. Accordingly, each of the water tank 202, the water port 204, the water pump 210, the water motor 214, and the one or more valves 216 may be mounted on the frame 104 of the machine 102. In some embodiments, as shown in FIG. 4, the water supply system 206 may be provided on any one of the trans 104 of the machine 102 or the chassis 122 of the vehicle 118, based on application requirements.

Referring to FIGS. 1 to 5, the vehicle 118 includes an auxiliary power system 154 mounted on the chassis 122. The auxiliary power system 154 will be hereinafter interchangeably referred to as "the power system 154". The power system 154 includes an auxiliary engine 156. The auxiliary engine 156 may be an internal combustion engine powered by any fuel known in the art, such as diesel, gasoline, natural gas, and so on. Accordingly, the auxiliary engine 156 may be fluidly coupled to the auxiliary fuel tank 148 via a second fuel line 158. In some embodiments when the auxiliary fuel tank 148 may be omitted, the auxiliary engine 156 may be fluidly coupled to the fuel tank 108 provided on the machine 102.

The power system 154 also includes an electric generator 160 operably coupled to the auxiliary engine 156. The electric generator 160 is configured to generate electric power based on an operation of the auxiliary engine 156. The electric generator 160 is configured to be electrically coupled to the heating element 146 via a first line 162. Accordingly, the electric generator 160 is configured to provide electric power to the heating element 146 for operational requirements, such as for ignition purposes in case of the fuel powered burner, for continued heating in case of the electric heater, and so on. The electric generator 160 is also configured to be electrically coupled to the bitumen motor 136 and the water motor 214 via a second line 164 and a third line 166 respectively. Accordingly, the electric generator 160 is configured to provide electric power to the bitumen motor 136 and the water motor 214 for operational requirements, when the bitumen motor 136 and the water motor 214 may be electric motors.

Referring to FIGS. 1, 2, 3, and 5, the power system 154 is also electrically coupled to one or more of the bitumen filter 132, the bitumen pump 134, the bitumen hose 140, and the foaming bar 117 to provide electric heating thereto. More specifically, the electric generator 160 is electrically coupled to each of the bitumen filter 132, the bitumen pump 134, the bitumen hose 140, and the foaming bar 117 via a fourth line 168. The electric beating of each of the bitumen titter 132, the bitumen pump 134, the bitumen hose 140, and the foaming bar 117 provides to maintain the temperature of the bitumen therein within the predefined temperature range.

It should be noted that, in some embodiments (not shown), the auxiliary power system 154, including the auxiliary engine 156 and the electric generator 160, may be alternatively provided on the machine 102. In some embodiments, the auxiliary engine 156 may be omitted. In such a situation, the electric generator 160 may be operably coupled to the power source provided on the machine 102. As such, the electric generator 160 may be provided on any of the frame 104 of the machine 102 or the chassis 122 of the vehicle 118. In some embodiments, the auxiliary power system 154, including the auxiliary engine 156 and the electric generator 160, may be omitted. In such a situation, an electrical system (not shown) associated with the machine 102 may provide electric power to one or more components of the system 100, such as the heating element 146, the bitumen filter 132, the bitumen pump 134, the bitumen motor 136, the water motor 214, the bitumen hose 140, the foaming bar 117, and so on.

In another embodiment, referring to FIG. 4, one or more of the bitumen filter 132, the bitumen pump 134, the bitumen hose 140, and the foaming bar 117 is operably coupled to the heating element 146 to provide fluid heating thereto, when the heating element 146 may be the fuel powered burner. More specifically, the heating element 146 is fluidly coupled to each of the bitumen filter 132, the bitumen pump 134, the bitumen hose 140, and the foaming bar 117 via a heat line 402. In such a situation, a heating fluid may flow through the heating element 146 in order to increase a temperature thereof. The heating fluid may further flow through the heat line 402 in order to heat and maintain the temperature of the bitumen present in each of the bitumen filter 132, the bitumen pump 134, the bitumen hose 140, and the foaming bar 117 within the predefined temperature range. The heating fluid may flow back to the heating element 146 via a return line 404.

Referring to FIG. 5, in some embodiments, the vehicle 118 includes a hydraulic system 502 mounted on the chassis 122. The hydraulic system 502 includes a hydraulic pump 504. The hydraulic pump 504 is operably coupled to the power system 154 for receiving mechanical power therefrom for operational requirements. The hydraulic pump 504 is configured to provide a flow of hydraulic fluid from a reservoir 506. The hydraulic system 502 also includes a hydraulic valve 508 fluidly coupled to the hydraulic pump 504.

The hydraulic valve 508 is further fluidly coupled to the bitumen motor 136 via a first hydraulic line 510, the water motor 214 via a second hydraulic line 512, and the plurality of wheels 124 via a third hydraulic line 514. Accordingly, the hydraulic valve 508 is configured to receive the flow of hydraulic fluid from the hydraulic pump 504 and selectively distribute the flow of hydraulic fluid to the bitumen motor 136, the water motor 214, and the plurality of wheels 124 for operational requirements, when each of the bitumen motor 136, the water motor 214, and the plurality of wheels 124 may be hydraulically operated.

It should be noted that, in some embodiments, one or more components of the hydraulic system 502, such as the hydraulic pump 504, the reservoir 506, and the hydraulic valve 508 may be provided on the frame 104 of the machine 102. Alternatively, in some embodiments, one or more components of the hydraulic system 502, such as the hydraulic pump 504, and the reservoir 506 may be provided on the frame 104 of the machine 102, whereas the hydraulic valve 508, the first hydraulic line 510, the second hydraulic line 512, and the third hydraulic line 514 may be provided on the chassis 122 of the vehicle 118.

Referring to FIGS. 2 to 5, the system 100 also includes an air tank 172. In the illustrated embodiment, the air tank 172 is mounted on the chassis 122 of the vehicle 118. In other embodiments, the air tank. 172 may be, optionally or additionally, mounted on the frame 104 of the machine 102. The air tank 172 is configured to store compressed air therein. The air tank 172 is configured to be fluidly coupled to the foaming bar 117 via an air line 174. Accordingly, the air tank 172 is configured to provide a flow of air from the air tank 172 to the foaming bar 117. Additionally, one or more valves (not shown) may be provided in association with the air tank 172 and/or the air line 174 in order to control the flow of air.

Referring to FIGS. 2 to 5, the system 100 also includes a controller 170. The controller 170 may be provided on any of the frame 104 of the machine 102 or the chassis 122 of the vehicle 118. The controller 170 may be any control unit known in the art configured to perform various functions of the system 100. In one embodiment, the controller 170 may be a dedicated control unit configured to perform functions related to the system 100. In another embodiment, the controller 170 may be a Machine Control Unit (MCU) associated with the machine 102, an Engine Control Unit (ECU) associated with the power source and/or the auxiliary engine 156, and so on configured to perform functions related to the system 100.

The controller 170 is communicably coupled to, but not limited to, the machine 102, the foaming bar 117, the heating element 146, the bitumen motor 136, the water motor 214, the hydraulic valve 508, and the air tank 172. Accordingly, the controller 170 is configured to receive a signal indicative of one or more operational parameters associated with the machine 102. The operational parameters of the machine 102 may include, but not limited to, a speed of the machine 102 and/or the power source, a load on the power source, a depth of cut of the milling tool, an amount of milled material, and one or more quality parameters of the milled material.

Based on the received signal, the controller 170 is configured to control one or more of the bitumen pump 134, the heating, element 146, the water pump 210, the foaming bar 117, the hydraulic valve 508, and the air tank 172. More specifically, the controller 170 is configured to control one or more operational parameters of the bitumen motor 136, such as an operational speed thereof, and so on, based on one or more operational parameters of the machine 102. The controller 170 is configured to control one or more operational parameters of the heating element 146, such as the activation or deactivation thereof, and so on, based on one or more operational parameters of the machine 102.

The controller 170 is configured to control one or more operational parameters of the water motor 214, such as an operational speed thereof, and so on, based on one or more operational parameters of the machine 102. The controller 170 is also configured to control one or more operational parameters of the foaming bar 117, such as an amount of introduction of the foamed asphalt into the milling enclosure 114, and so on, based on one or more operational parameters of the machine 102. The controller 170 is further configured to control one or more operational parameters of the hydraulic valve 508, such as a position thereof, and so on, based on one or more operational parameters of the machine 102. The controller 170 is also configured to control one or more operational parameters of the air tank 172, such as an amount of the flow of air to the foaming bar 117, and so on, based on one or more operational parameters of the machine 102.

Figure 6:
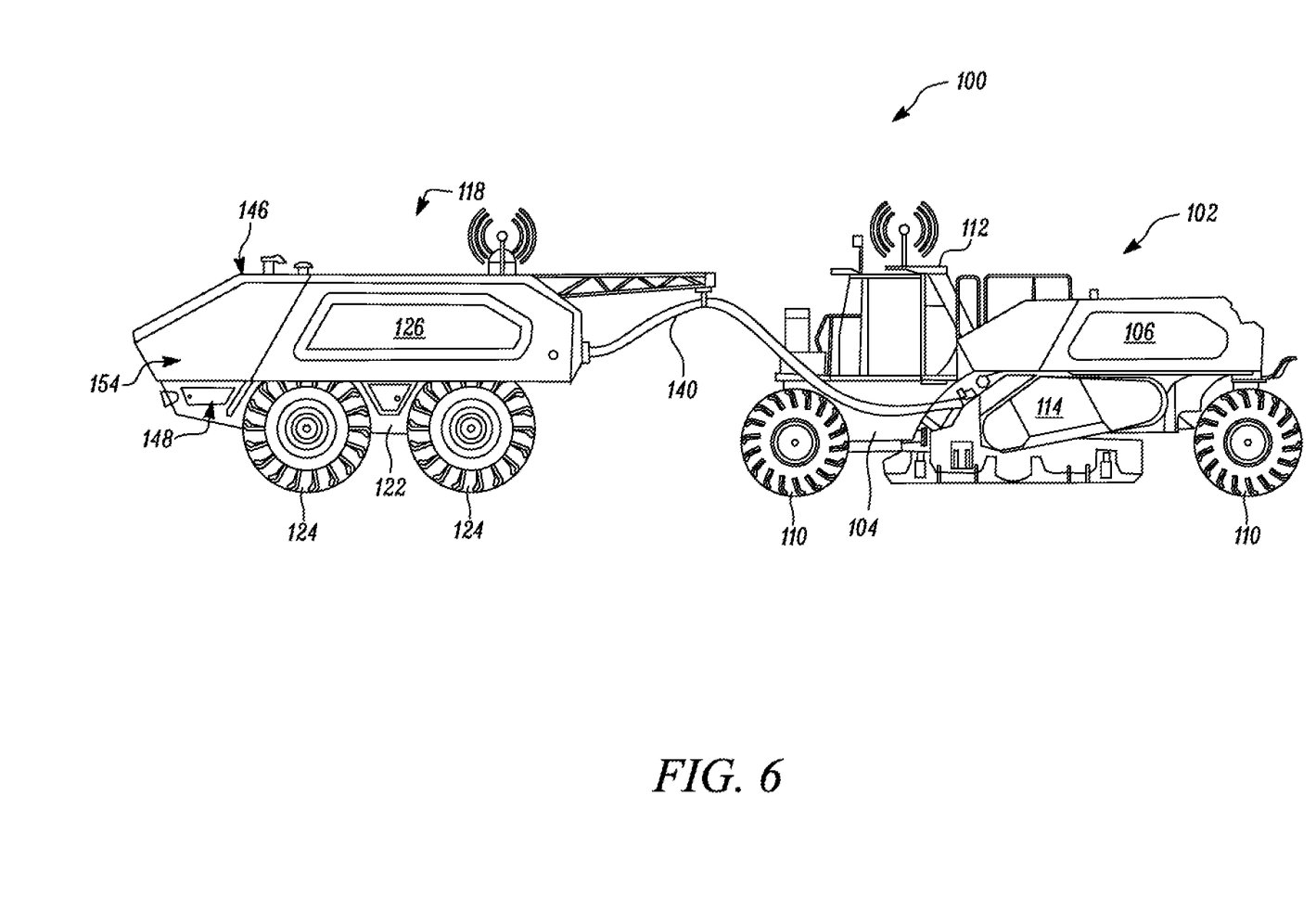
FIG. 6 is a side view of another exemplary rotary mixing system, according to another embodiment of the present disclosure.

Referring to FIG. 6, in some embodiments, the machine 102 may be wirelessly connected to the vehicle 118. Accordingly, the vehicle 118 may include a dedicated power source (not shown) provided thereon in order to propel the vehicle 118 and provide power to one or more components thereon, such as the bitumen supply system 130, the water supply system 206, the hydraulic system 502, and/or the heating element 146, and so on, for operational requirements. In such a situation, the connector link 120 may be omitted and the bitumen hose 140 may be provided to allow the flow of bitumen from the vehicle 118 to the machine 102. Also, the machine 102 and/or the vehicle 118 may include one or more components (not shown) configured to provide remote and wireless connection including, but not limited to, an image capturing device, a positioning system, and a position sensor.

In some embodiments, the operator cabin 112 may be provided on the machine 102 in order to control the machine 102, whereas an operator cabin on the vehicle 118 may be omitted. As such, one or more parameters of the vehicle 118 including, but not limited to, a speed of the vehicle 118 with respect to the machine 102, a distance of the vehicle 118 with respect to the machine 102, and a steering of the vehicle 118 may be wirelessly and remotely controlled via the operator cabin 112 on the machine 102.

In some embodiments, the operator cabin (not shown) may be provided on the vehicle 118 in order to control the vehicle 118, whereas the operator cabin 112 on the machine 102 may be omitted. As such, one or more parameters of the machine 102 including, but not limited to, a speed of the machine 102 with respect to the vehicle 118, a distance of the machine 102 with respect to the vehicle 118, and a steering of the machine 102 may be wirelessly and remotely controlled via the operator cabin on the vehicle 118.

In some embodiments, the operator cabin 112 may be provided on both the machine 102 and the vehicle 118 in order to provide local control of the machine 102 and the vehicle 118 respectively as well as to provide wireless connection between the machine 102 and the vehicle 118. In some situations, the operator cabin 112 may be modular in nature, such that the same operator cabin 112 may be installed on the machine 102 or the vehicle 118, based on application requirements. In some embodiments, the operator cabin 112 may be omitted from both the machine 102 and the vehicle 118. In such a situation, both the machine 102 and the vehicle 118 may be remotely and wirelessly controlled via an onsite or an offsite control station (not shown).

In some embodiments, the vehicle 118 may be remotely and wirelessly connected to multiple machines 102 simultaneously. In such a situation, multiple bitumen hoses 140 may be coupled between the vehicle 118 and the multiple maims 102 in order to provide the flow of bitumen from the vehicle 118 to the multiple machines 102. In some embodiments, the remote and wireless connection between the machine 102 and the vehicle 118 may provide continuous on-the-fly refilling of the bitumen tank 126 on the vehicle 118.

For example, when a level of the bitumen in the bitumen tank 126 may drop below a predefined limit, the vehicle 118 may approach a bitumen plant (not shown) or a bitumen tanker (not shown) present on the worksite for refilling the bitumen tank 126. During travel of the vehicle 118 away from the machine 102 for refilling, the bitumen hose 140 may be connected between the vehicle 118 and the machine 102 based on an extended length of the bitumen hose 140. Accordingly, the machine 102 may continue to perform a predefined operation thereof. As the vehicle 118 may be refilled, in some situations, the vehicle 118 may wait for the machine 102 to perform the operation and approach the vehicle 118 before continuing travel alongside the machine 102, or in some situations may travel and approach the vehicle 118 in order to continue travel alongside the machine 102 along an initial travel path.

INDUSTRIAL APPLICABILITY

Figure 7:
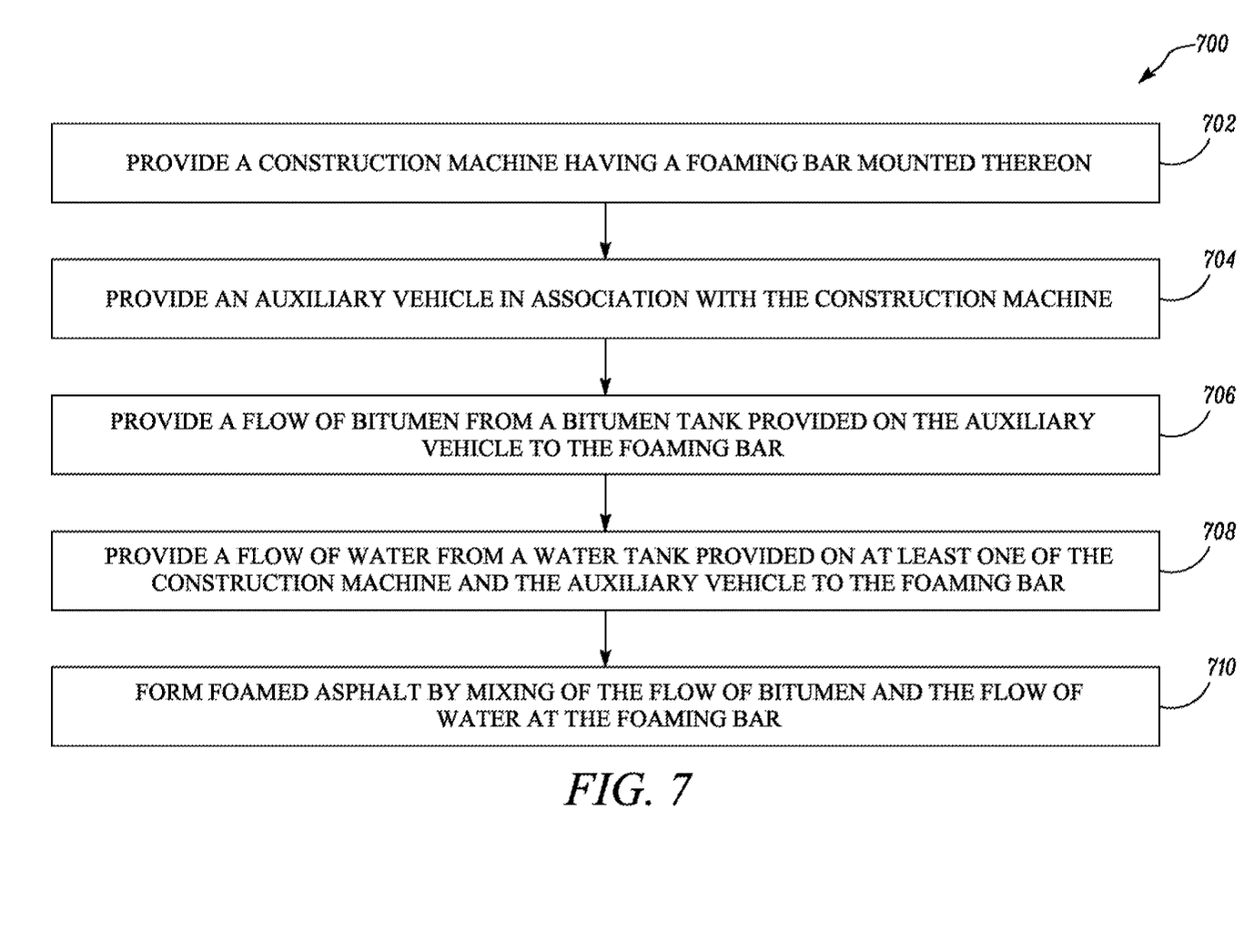
FIG. 7 is a flowchart illustrating a method for forming foamed asphalt using the rotary mixing system of FIGS. 1 and 7, according to one embodiment of the present disclosure.

The present disclosure relates to a method 700 for forming foamed asphalt using the system 100. Referring to FIG. 7, a flowchart of the method 700 is provided. At step 702, the construction machine 102 having the foaming bar 117 mounted on the frame 104 thereof is provided. At step 704, the auxiliary vehicle 118 is provided in association with the machine 102, in some embodiments, as shown in FIGS. 1 to 5, the vehicle 118 may be coupled to the machine 102 via the connector link 120. In some embodiments, as shown in FIG. 6, the vehicle 118 may be communicably coupled to the machine 102 via the wireless connection.

At step 706, the flow of bitumen is provided from the bitumen tank 126 to the foaming bar 117. The bitumen supply system 130, including the bitumen tank 126, is provided on the chassis 122 of the vehicle 118. At step 708, the flow of water is provided to the foaming bar 117. The flow of water is provided from the water supply system 206. The water supply system 206 may be provided on any of the frame 104 of the machine 102 or the chassis 122 of the vehicle 118. At step 710, the foamed asphalt is formed by mixing of the flow of bitumen and the flow of water at the foaming bar 117, such as by adding controlled quantity of the water at ambient temperature to the heated bitumen.

In some embodiments, the flow of air may be mixed with the flow of bitumen and the flow of water at the foaming bar 117 in order to form the foamed asphalt, based on application requirements. The flow of air may be provided to the foaming bar 117 from the air tank 172 provided on any of the frame 104 of the machine 102 or the chassis 122 of the vehicle 118. Additionally, the bitumen present within the bitumen tank 126 may be heated and maintained within the predefined temperature range using the heating element 146 provided in association with the bitumen tank 126. Also, the bitumen present within the bitumen filter 132, the bitumen pump 134, the bitumen hose 140, and/or the foaming bar 117 may be heated using the heating fluid from the fuel powered burner and/or the electric heating from the power system 154.

The system 100 provides a simple, effective, and cost efficient method for providing a continuous supply of the bitumen maintained at a required temperature to be mixed with the milled material. As such, the system 100 may provide an improved quality of the foamed asphalt at the required temperature, in turn, providing improved quality of an end product. Also, the system 100 may provide to limit operational cost related to movement of the bitumen tankers back and forth to the bitumen plant when the bitumen therein may cool down in order to refill with heated bitumen.

The system 100 also provides different configurations of the vehicle 118 in order to mount one or inure components on the vehicle 118 and/or the machine 102, based on user requirements, in turn, providing system flexibility. Also, the single vehicle 118 may be coupled to any machine 102 from a fleet of machines 102 as may be required, in turn, providing improved operational flexibility, improved productivity of the vehicle 118, reduced capital cost, and so on.

Also, the remote and wireless connection between the vehicle 118 and the one or more machines 102 may provide partial or complete automation of the process, thus, providing reduced process error, reduced rework, reduced labor, reduced operator intervention, reduced process cost, reduced process duration, improved process efficiency, improved product quality, and so on. Further, the on-the-fly refilling of the vehicle 118 may provide continuous refilling with continuous operation of the machine 102, reduced refill time, reduced process downtime, and so on.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of the disclosure. Such embodiments should be understood to fall within the scope of the present disclosure as determined based upon the claims and any equivalents thereof.

What is claimed is:

1. A rotary mixing system comprising:
   a construction machine including:
      a frame;
      a power source mounted on the frame;
      a milling tool rotatably mounted on the frame and configured to be selectively coupled to the power source; and
      a foaming bar mounted on the frame in association with the milling tool; and
   an auxiliary vehicle configured to be coupled to the construction machine, the auxiliary vehicle including:
      a chassis;
      a plurality of wheels movably mounted to the chassis;
      a bitumen tank mounted on the chassis;

a heating element coupled to the bitumen tank;
a bitumen pump fluidly coupled to the bitumen tank;
a bitumen hose fluidly coupled to the bitumen pump and the foaming bar; and
an auxiliary power system mounted on a one of the frame of the construction machine and the chassis of the auxiliary vehicle.

2. The rotary mixing system of claim 1 further including a water supply system provided on at least one of the construction machine and the auxiliary vehicle, the water supply system including:
a water tank; and
a water pump fluidly coupled to the water tank and the foaming bar.

3. The rotary mixing system of claim 2 further including a hydraulic system provided on at least one of the construction machine and the auxiliary vehicle, the hydraulic system including:
a hydraulic pump; and
a hydraulic valve fluidly coupled to the hydraulic pump and at least one of the bitumen pump, the water pump, and the plurality of wheels.

4. The rotary mixing system of claim 2, wherein the auxiliary power system including:
an auxiliary engine; and
an electric generator operably coupled to the auxiliary engine, the electric generator configured to be electrically coupled to at least one of the heating element, the bitumen pump, and the water pump.

5. The rotary mixing system of claim 4 further including a fuel tank provided on at least one of the construction machine and the auxiliary vehicle, the fuel tank configured to be fluidly coupled to at least one of the heating element and the auxiliary engine.

6. The rotary mixing system of claim 1 further including an air tank provided on at least one of the construction machine and the auxiliary vehicle, the air tank configured to be fluidly coupled to the foaming bar.

7. The rotary mixing system of claim 1, wherein the heating element is configured to be operably coupled to at least one of the bitumen pump, the bitumen hose, and the foaming bar.

8. The rotary mixing system of claim 7, wherein the heating element is at least one of a fuel powered burner and an electric heater.

9. An auxiliary vehicle configured to be selectively coupled to a construction machine, the auxiliary vehicle including:
a chassis;
a plurality of wheels movably mounted to the chassis;
a bitumen tank mounted on the chassis;
a heating element coupled to the bitumen tank;
a bitumen pump fluidly coupled to the bitumen tank; and
a bitumen hose fluidly coupled to the bitumen pump and configured to be selectively coupled to a foaming bar associated with the construction machine to provide foamed asphalt from the foaming bar for introduction into a milling enclosure;
a water tank;
a water pump fluidly coupled to the water tank and configured to be selectively coupled to the foaming bar; and
a controller communicably coupled to at least one of the bitumen pump, the heating element, the water pump, the foaming bar, and the construction machine.

10. The auxiliary vehicle of claim 9 further including:
a hydraulic pump; and
a hydraulic valve fluidly coupled to the hydraulic pump and at least one of the bitumen pump, the water pump, and the plurality of wheels.

11. The auxiliary vehicle of claim 9 wherein, the controller is configured to:
receive a signal indicative of at least one operational parameter associated with the construction machine; and
control at least one of the bitumen pump, the heating element, the water pump, and the foaming bar based, at least in part, on the received signal.

12. The auxiliary vehicle of claim 9 further including:
an auxiliary engine; and
an electric generator operably coupled to the auxiliary engine, the electric generator configured to be electrically coupled to at least one of the heating element, the bitumen pump, and the water pump.

13. The auxiliary vehicle of claim 12 further including a fuel tank configured to be fluidly coupled to at least one of the heating element and the auxiliary engine.

14. The auxiliary vehicle of claim 9 further including an air tank configured to be fluidly coupled to the foaming bar.

15. The auxiliary vehicle of claim 9, wherein the heating element is configured to be operably coupled to at least one of the bitumen pump, the bitumen hose, and the foaming bar.

16. The auxiliary vehicle of claim 15, wherein the heating element is at least one of a fuel powered burner and an electric heater.

* * * * *